Figure 1:
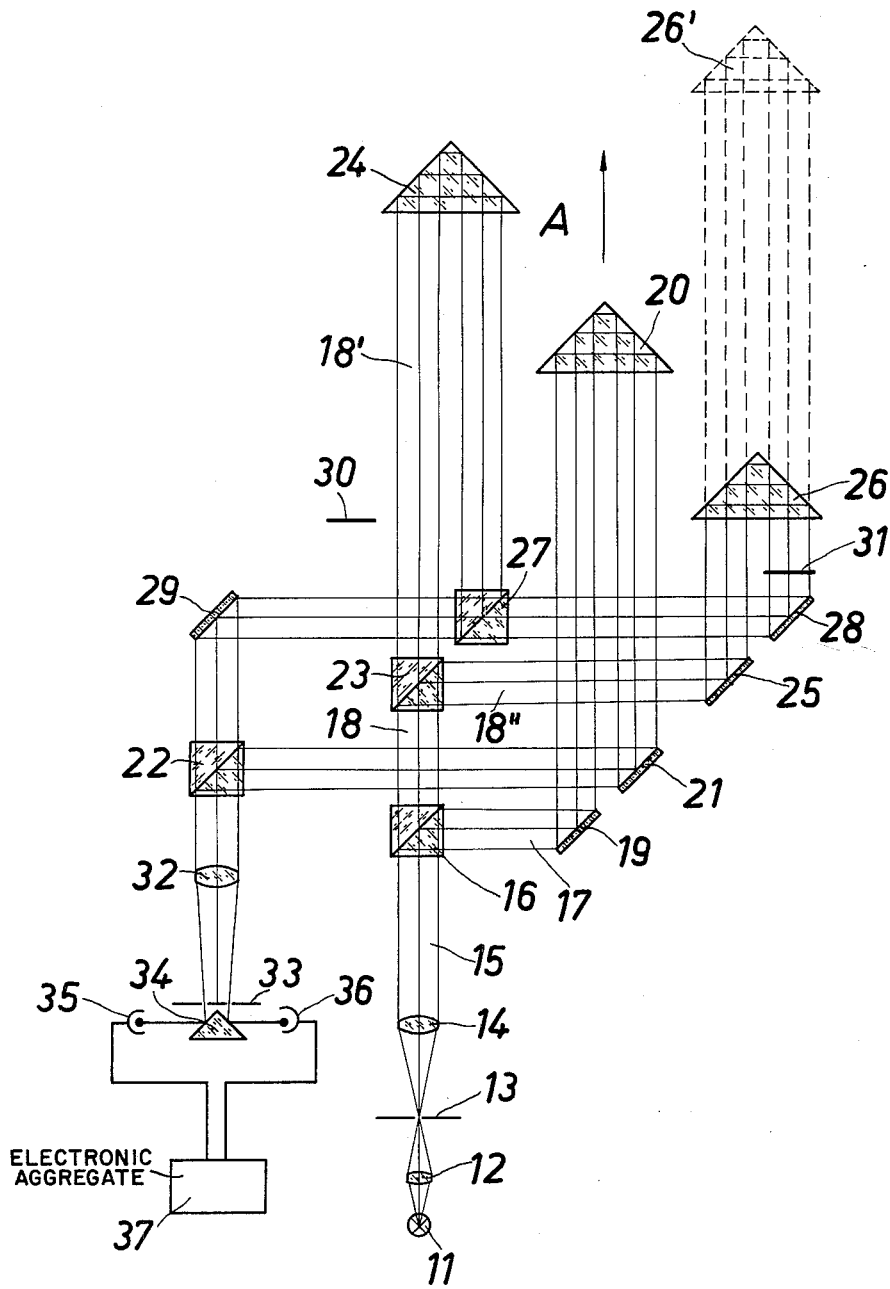

Dec. 28, 1965     K. SCHUCH     3,225,644
APPARATUS PRODUCING INTERFERENTIAL TEST DATA
FOR MEASURING AND CONTROL INSTRUMENTS
Filed Oct. 16, 1961

Inventor
Kurt Schuch

United States Patent Office 3,225,644
Patented Dec. 28, 1965

3,225,644
APPARATUS PRODUCING INTERFERENTIAL TEST DATA FOR MEASURING AND CONTROL INSTRUMENTS
Kurt Schuch, Jena, Germany, assignor to VEB Carl Zeiss Jena, Jena, Germany
Filed Oct. 16, 1961, Ser. No. 145,514
3 Claims. (Cl. 88—14)

Exact linear measurements are frequently made by exploiting the interference capacity of light waves emitted by a light source. The disadvantage however of the coherence conditions to be adhered to in measurements of this kind depending essentially on the nature of the used light source and restricting measurements to a small range hardly more than one decimeter has induced many a person skilled in the art to attempt an expansion of that range by using appropriate and novel means and methods.

One possibility of such an expansion lies in the choice or creation of a corresponding light source and, accordingly, light sources have been developed which work for instance on the isotope principle. The wave trains such sources emit are interferable within greater lengths (approximately 10 decimeters), but the range is still too small for quite a variety of purposes and, moreover, the industrial use of such sources is by no means economic, being dependent as they are on costly ancillary devices and specially trained operators.

Another possibility of enlarging the measuring range consists in increasing the straight reference line by addition or multiplication, as for instance Kösters or Väisälä have done. If a straight line corresponding to $n$ times the coherence length of the used light is to be measured as taught by Kösters, it will be necessary either to employ $n$ stationary reference planes or to displace one reference plane $(n-1)$ times. Apart from the fact that the number of the reference planes used is restricted by reasons of intensity, it is not possible in either of the said two cases or in that of Väisälä to effect a continuous interferential length measurement of the kind required for instance for high and highest precision control of machine tools, as a change from one reference plane to another or a readjustment of the one single reference plane necessarily involves an interruption of the measuring process.

The present invention aims at overcoming these disadvantages and to this end provides an apparatus for continuously producing interferential test data, that is to say an apparatus which permits measurements to be made without transitory interruptions even if the measuring ranges referred to above are greatly surpassed. The invention achieves this by providing that the juxtaposed reference planes are alternately displaceable in the ray path, the one, not displaced, reference plane being used for measuring while the other reference plane is being subjected to such a displacement that the change of the respective reference beam is no greater than twice the coherence length of the light employed. The measuring and reference planes are advantageously represented by inverting prisms having a corresponding deflection insensivity.

To ensure that only the stationary reference plane takes effect in the measurement and the possibility of faulty measurement is excluded, each reference plane has a diaphragm which stops it down while it is being displaced.

Measurement by means of the apparatus according to the invention is similar to that in the known interference comparator for testing end measures in which two interference-fringe systems are observed. A considerable difference resides however in that this known interference comparator measures a definite length, to which end the fringe systems though displaced relatively to each other are at rest, in contradistinction whereto the apparatus according to the invention can measure continuously changing lengths, an interference-fringe system being displaced relatively to a reference mark. This case requires the interference fringes travelling past the reference mark to be counted and the sought length to be derived from the obtained number of interference fringes. Subjective counting of that kind cannot however be tolerated for reasons of reliability and accuracy and is far too troublesome. To exclude disadvantageous influences from the part of the observer, it is profitable to have the interference fringes counted by objectively working optical as well as photoelectric and electronic means indicating not only the number of the travelling interference fringes but also the direction of the motion of these fringes and accordingly the kind of the change in length (shortening or lengthening). For instance, the light beam is divided into two partial beams at the locus of the produced interference image, and the one beam is displaced by rotation of a plane parallel glass plate and the interference fringe system produced by the one partial beam is accordingly displaced relatively to that produced by the other partial beam, or, alternatively, two diaphragm apertures are parallel to each other in such a manner that an interference fringe travelling past them produces two differently timed impulses. The resulting optical impulses subsequently to transformation into electric impulses are counted electronically in the known manner according to direction.

Each optical impulse transmitter has to this effect a photocell which produces photocurrents corresponding to the optical impulses, an aggregate constructed as an impulse former transforming these photocurrents into acute electric impulses. The impulses which are due for instance to the interference fringes travelling past the diaphragm apertures and which are exactly defined in the impulse former then influence a discriminator in such a manner that the impulse due to exposure of the one photocell indicates the direction and that the impulse due to exposure of the other photocell indicates the magnitude of the count. The discriminator thus controls the count according to the phase difference of the impulses. Devices operating in that manner are described in the "Journal of the Optical Society of America," vol. 43 (1953), by Peck and Obetz (No. 6) as well as by Franklin and Branin (No. 10).

To increase the light yield and avoid complicated electronic amplifiers, it is of advantage to coordinate to each reference ray-path a measuring ray-path as well as means for counting the travelling interference fringes according to direction. The optical arrangement may be such that the rays emitted by a light source are divided into two beams and each of these beams is divided physically into a measuring and a reference beam, both of which are after deflection in the measuring plane and the reference plane, respectively, physically combined to form an interference beam. Alternatively, the measuring beam can be physically divided after reflection in the measuring plane and shortly before fusion with the partial reference beams, and the partial measuring beams can be physically fused with the partial reference beams. It is of advantage in this case to use for the transition from one reference plane to another and from one direction-defined counting means to another an electronic switch the switching time of which is smaller than the impulse sequence at the greatest possible speed of the measuring prism.

The electronic switch consists on principle of two gate connections, the one stopping the signals and the other letting them pass and connecting to the electronic for and backward counter that of the two impulse transmitters which supplies the direction-defined counting impulses from the interferometer ready to deal with measuring data. The switching can be controlled by flip-flop circuits and is released only when the not used interferometer has in its turn become ready to deal with measuring data.

Figure 2:
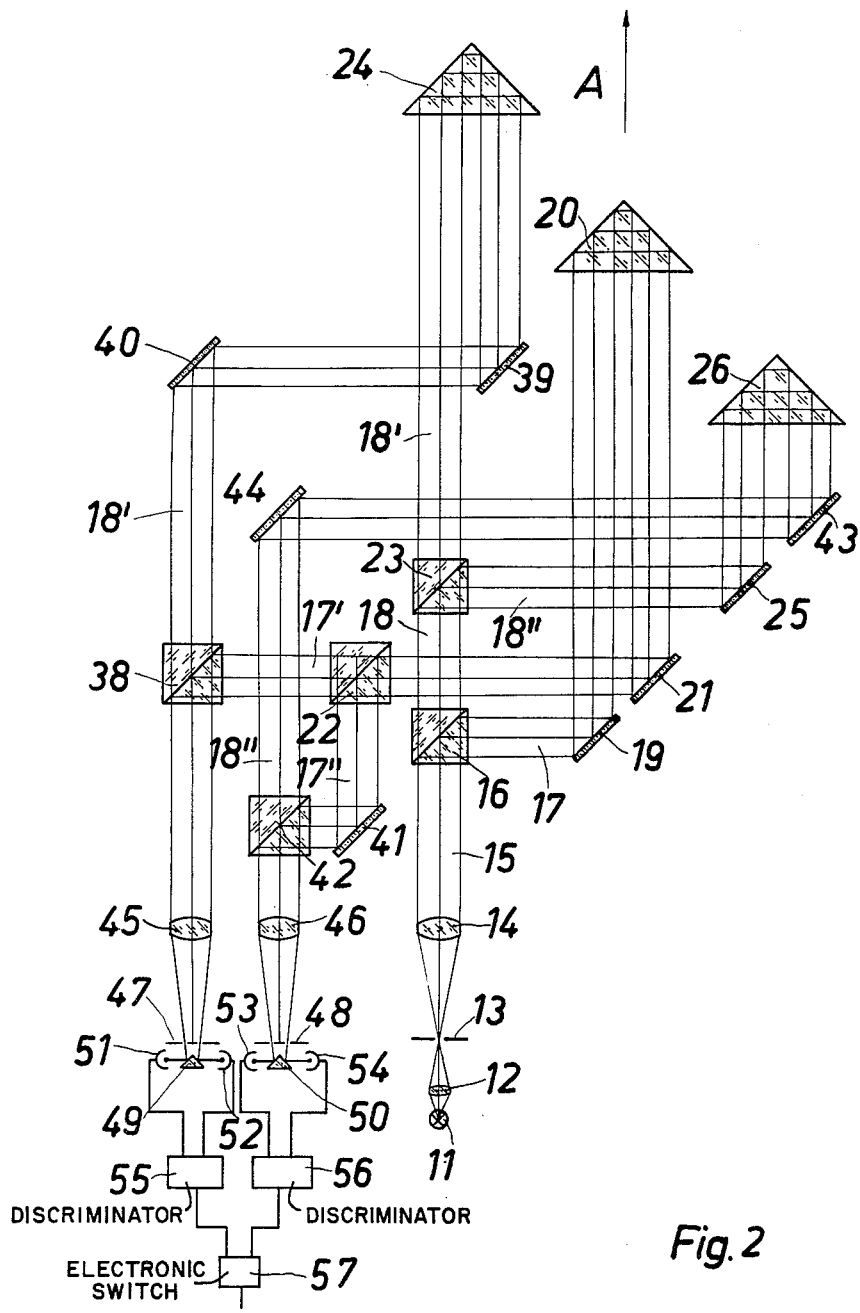
Figure 3:
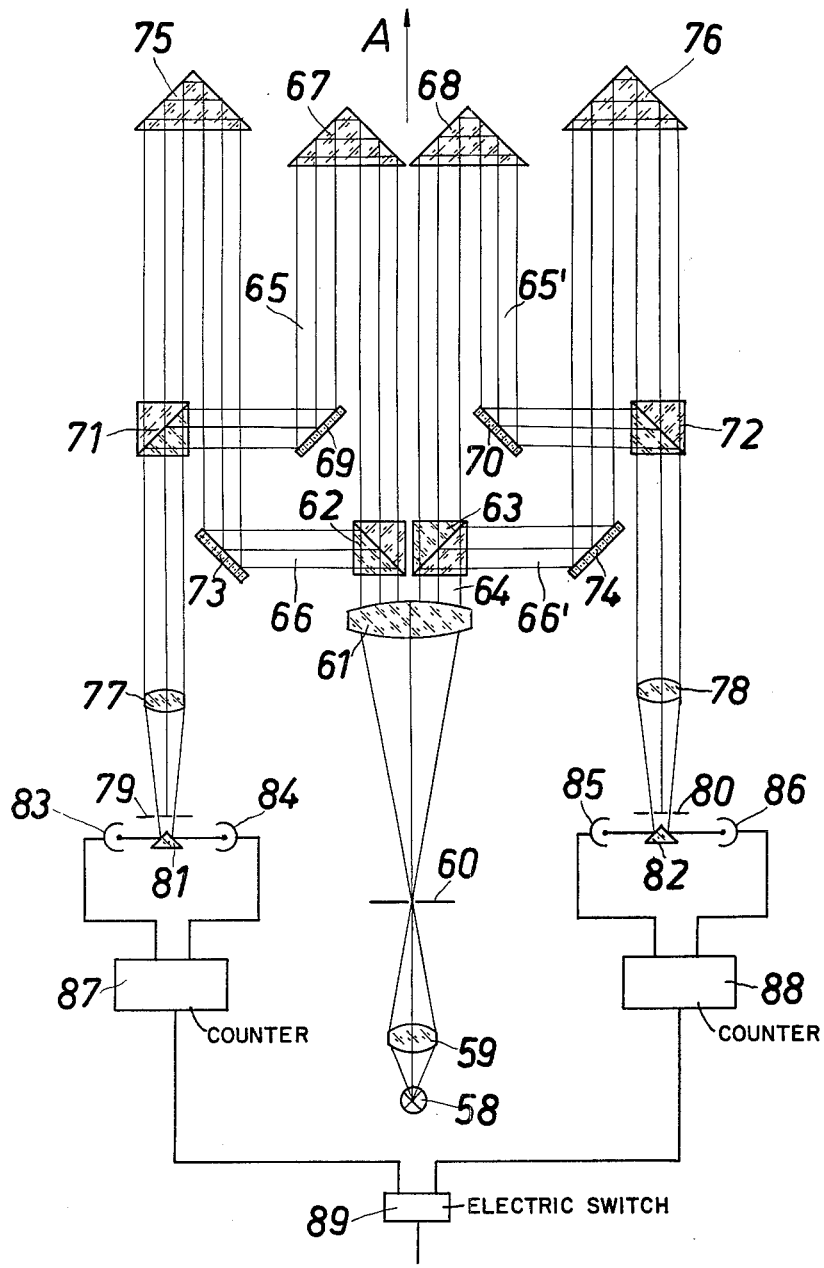
Figure 5:
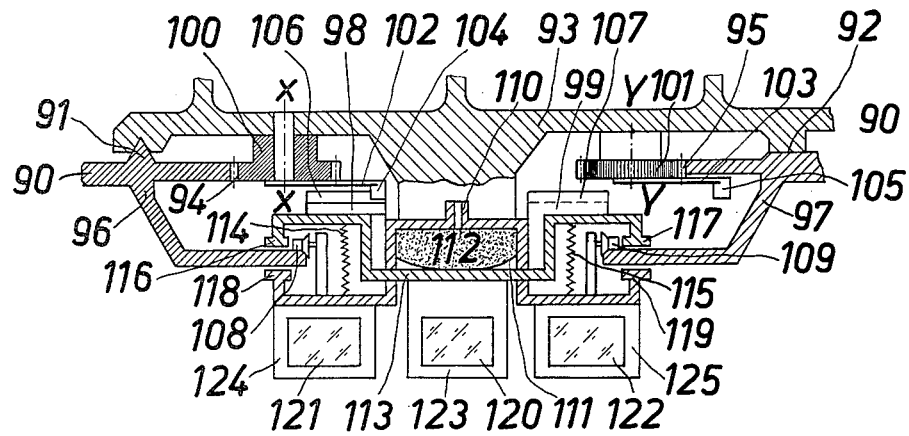
Figure 4:
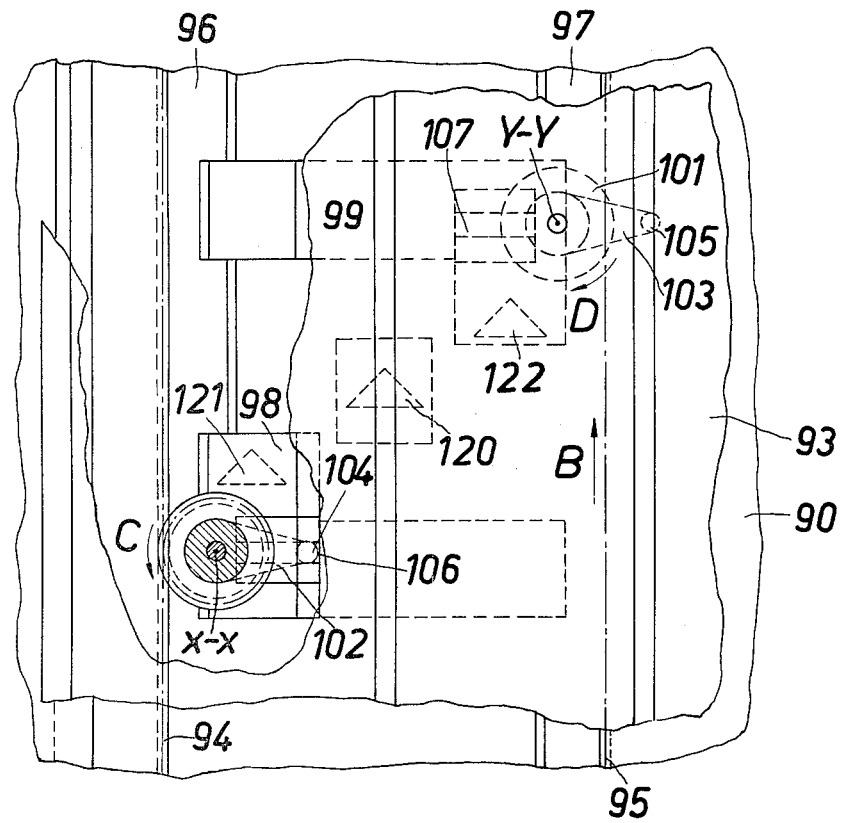
Figure 6:
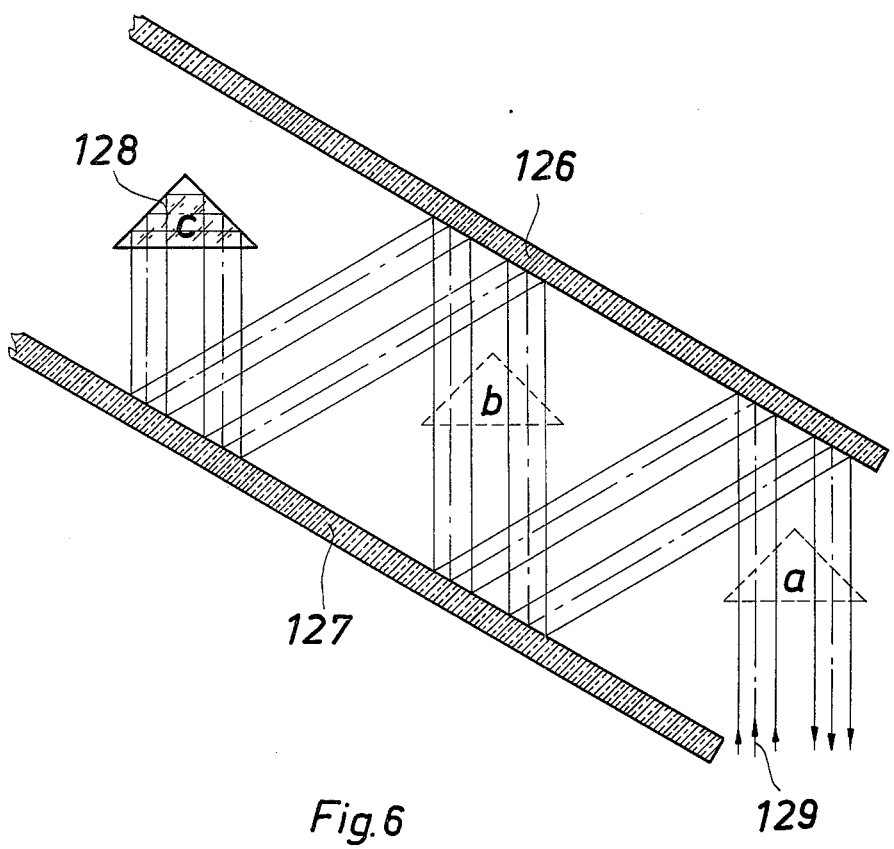

In order that the construction and operation of the apparatus according to the invention may be more readily understood, reference is made to the accompanying drawings, in which FIGS. 1 to 3 illustrate diagrammatically and by way of example three embodiments of the said apparatus, FIGS. 4 and 5 show diagrammatically in plan view and side elevation, respectively, the parts of the apparatus which carry the reference planes, and FIG. 6 shows an alternative to FIGS. 1 to 3.

In FIGS. 1 and 2, a light source 11 is imaged by means of a condenser 12 in the plane of an aperture 13 coinciding with the focal plane of a collimator lens 14. The parallel ray path 15 of the lens 14 contains a division cube 16 which divides the parallel ray beam into a measuring beam 17 and a reference beam 18.

The reflected part of the parallel-ray beam, viz. the measuring beam 17, is at right angles to the collimator axis until it is deflected by a plane mirror 19 into a direction parallel to the collimator axis and impinges on a measuring plane represented by a right-angled prism 20. The prism 20 effects a constant deviation of the measuring beam by 180°. The beam thus deflected back parallel to itself is directed by a mirror 21 to a division cube 22.

That part of the parallel-ray beam 15 which the division cube 16 does not deflect, viz. the reference beam 18, is divided by a division cube 23 into two partial beams 18' and 18". The partial beam 18' is transmitted direct to a reference plane represented by a right-angled prism 24 and the partial beam 18" is directed via a plane mirror 25 to a reference plane represented by a right-angled prism 26. The prisms 24 and 26, which for producing interferences of equal inclination relative to the prism 20 are rotated a small amount (not representable in the drawing) about an axis at right angles to the plane of the drawing, deflect the two reference beams 18' and 18" in the same manner as the prism 20 deflects the measuring beam 17.

The reference beams 18' and 18" after deflection by the prisms 24 and 26, respectively, are in the embodiment, FIG. 1, directed by a division cube 27 and a mirror 28, respectively, via a mirror 29 to the division cube 22, where they combine with the measuring beam 17. To the reference beams 18' and 18" are correlated diaphragms 30 and 31, respectively, for cutting out at option the prism 24 or 26 and, accordingly, the respective reference beam. The parts of the reference beam 18 and the measuring beam 17 which are released by the diaphragm 30 are subsequently to fusion directed to a convergent lens 32 which due to the superposition of the coherent beams 17 and 18 causes an interference fringe to be produced in a plane having in its neighbourhood a diaphragm 33 with two apertures. When the prism 20 is displaced, the interference fringes at right angles to the plane of the drawing move past the slits of the diaphragm 33. The resulting light impulses pass over a roof prism 34 to two photoelectric cells 35 and 36, which transform them into photocurrents. These photocurrents are submitted to further treatment and evaluated in an aggregate 37, which has an electronic impulse former, a discriminator and a counter.

A driving mechanism (not shown in FIG. 1) imparts to the prism 20, viz. the measuring plane, a continuous displacement in a direction A indicated by an arrow. The position of the prism 24, viz. the respective effective reference plane, remains unchanged and depends on a range of displacement determined by the coherence length of the light. The coherent beams 17 and 18' reflected by the prisms 20 and 24, respectively, are subsequently to fusion interfered by the division cube 22, and the convergent lens 32 produces the images of this interference in the immediate neighbourhood of the diaphragm 33 having two apertures. The interference fringes the continuous displacement of the prism 20 causes to travel past the diaphragm 33 produce light impulses which via a roof prism 34 proceed alternately to the photocell 35 and the photocell 36. The time interval between the respective photocurrents enables the electronic means in the aggregate 37 to determine the direction and the magnitude of displacement of the measuring plane according to the wavelength of the light used.

During the time the two prisms 20 and 24 cooperate with each other, the prism 26 rendered optically ineffective by diaphragm 31 effects a displacement only a little smaller than twice the coherence length of the used light and is thus given a new position 26'. The prism 26 in its new position 26' serves as a reference plane the very moment the distance apart of the prisms 20 and 24 has become so great that the contrast of the interference fringes produced by the ray paths 17 and 18' and, accordingly, the A.C. portion of the photoelectric currents are not strong enough any longer to release well-defined measuring impulses. The prism 26' is arrested automatically and, as soon as the two prisms 20 and 24 have the said distance apart, it is released by the removal of the diaphragm 31 from the ray path 18", in consequence of which the diaphragm 30 comes to lie in the ray path 18' and renders the prism 24 ineffective. Thereupon the prism 24 is automatically unclamped and displaced the same amount as the prism 26 had been before. This process can be repeated as often as desired, the prisms 24 and 26 acting alternately as effective reference planes.

When changing from the one reference plane to the other, both these planes are effective for a short time and there appear two superposed interference-fringe systems. Accordingly, to safeguard satisfactory measurement also during the time of the change it is necessary to so control the displacement of the reference planes that the distance apart of the measuring plane and the abandoned reference plane is slightly greater than the distance apart of the measuring plane and the reference plane set to work again. In consequence thereof, the contrast of the newly created interference-fringe system will be greater than that of the previously used interference-fringe system, the photoelectric current produced emitting a well-defined measuring impulse.

The measuring apparatus, FIG. 2, differs from the one shown in FIG. 1 in that there is no diaphragm but each partial reference beam cooperates with a partial measuring beam and an independent device for transforming the light pulses into electric pulses. The division cube 22 divides the measuring beam 17 into two partial beams 17' and 17". The partial beam 17' combines in a division cube 38 with a partial beam 18' of the reference beam deflected by the prism 24 and two mirrors 39 and 40, and the partial beam 17" after deflection on a mirror 41 combines in a division cube 42 with the partial beam 18" of the reference beam deflected by the prism 26 and two mirrors 43 and 44. The interfering partial beams 17', 18' and the interfering partial beams 17", 18" traverse respectively convergent lenses 45 and 46. These lenses 45 and 46 image an interference-fringe system in the immediate neighbourhood of double-aperture diaphragms 47 and 48, respectively. The surfaces of roof prisms 49 and 50 direct the light traversing the apertures to two photoelectric cells 51, 52 and 53, 54, respectively, and the photocurrents produced in these cells undergo further treatment in aggregates 55 and 56 in the form of discriminators and in a common electronic switch 57.

When the prism 20 is being displaced in the direction A, the interference fringes will travel past the double-aperture diaphragms 47 and 48 in such a manner that over the roof prisms 49 and 50 first the photocells 51, 53 and then the photocells 52, 54 are illuminated. The change from the one reference plane to the other takes place behind the aggregates 55 and 56, an impulse counting mechanism (not shown) supplying over the electronic switch 57 the electric pulses from the aggregate 55 in the one case and the electric pulses from the aggregate 56 in the other case. This reversal is effected at about the same time as in the diaphragm changing device shown in FIG. 1. The time of the changeover is smaller than that of the sequence of the pulses at the greatest displacement speed of the measuring prism 20.

In FIGS. 1 and 2 the mirrors and division cubes are located in such a manner that the reflecting, dividing or uniting surfaces are parallel to each other and the measuring beam comes to lie between the reference beams. It is also possible however so to arrange these surfaces that the measuring beam is below or above the reference beams, the partial reference beams being for instance close to each other and the measuring beam closely above or below them.

FIG. 3 shows a light source 58, a condenser 59, a diaphragm 60 having an aperture, and a collimator lens 61 big enough to completely illuminate two division cubes 62 and 63 facing its side remote from the light source. These division cubes 62 and 63 divide a parallel-ray beam 64 from the lens 61 into two parts 65, 66 and 65', 66', the partial beams 65 and 65' being measuring beams and the partial beams 66 and 66' being reference beams. The measuring beams 65 and 65' are deviated respectively by right-angled prisms 67 and 68, representing measuring planes, via plane mirrors 69 and 70 to division cubes 71 and 72. The cube 71 reunites the measuring beam 65 with the reference beam 66 deflected by a mirror 73 and a right-angled prism 75 which constitutes a reference plane, and the cube 72 reunites the measuring beam 65' with the reference beam 66' deflected by mirror 74 and a right-angled prism 76 which constitutes a reference plane. The prisms 67 and 68 are rigidly interconnected and displaceable in the direction of an arrow A. The united beams leaving the division cubes 71 and 72 traverse convergent lenses 77 and 78, respectively, which cause interference-fringe systems to appear directly in front of double-aperture diaphragms 79 and 80. The interference fringes appearing in these diaphragm apertures illuminate over roof prisms 81 and 82 two photoelectric cells 83, 84 and 85, 86, respectively, aggregates 87 and 88 counting the impulses of these cells in dependence on direction. An electronic switch 89 directs the impulses emitted by either the aggregate 87 or the aggregate 88 to an impulse counting mechanism (not shown) and a calculating machine (not shown) determining the length of the displacement according to the number of impulses given. The measuring apparatus operates as described with reference to FIGS. 1 and 2.

Alternatively to FIG. 3, the division cubes 62 and 63 can be arranged above each other and instead of the two prisms 67 and 68 one correspondingly shaped measuring prism can be used, the consequence being a considerable simplification in the construction of the measuring apparatus.

It has so far been assumed there is no difficulty in displacing the reference planes parallel to the measuring beam. Yet it may happen that a displacement of the reference planes in that direction cannot take place for want of space. In this case it is advantageous to arrange the parts as shown in FIG. 6 with respect to one reference plane. Between two plane mirrors 126 and 127 having reflecting surfaces parallel to each other is disposed a right-angled prism 128 which is displaceable parallel to the said reflecting surfaces and their common main reflection plane. The range of the displacement of the prism 128 is subdivided into several equal sections. Two of these sections are shown in FIG. 6, the one between the dash-lined positions a and b and the other between the dash-lined position b and the solid-line position c of the prism 128. The displacement of the prism 128 over a section, from a to b or from b to c, is such that the optical path length of a reference beam 129 coming from a division cube (not shown) is changed an amount which, owing to the contrast of the interference fringes, may not be greater than twice the coherence length of the light used. The prism 128 when assuming position a deviates the reference beam 129 by only 180° and when assuming another position, for instance b or c, causes the reference beam 129 to be deflected one or several times by the mirrors 126 and 127 and directed to the prism 128, which reflects the beam back parallel to itself.

FIGS. 4 and 5 are explanatory of how the movements of the reference planes are controlled in dependence on the movement of the measuring plane. In FIGS. 4 and 5, the numeral 90 designates the bed of a machine, for instance a machine tool, provided with a guide prism 91 and a gliding surface 92 for a slide 93, two racks 94 and 95 as well as two supports 96 and 97 which lie substantially in a plane parallel to the slide 93 and carry two angular slides 98 and 99. The racks 94 and 95 are in mesh with gear wheels 100 and 101, respectively, the wheel 100 being correlated to the slide 98 and the wheel 101 to the slide 99. These wheels 100 and 101 are mounted on the lower side of the slide 93 for rotation about axes X—X and Y—Y, respectively, which, in FIG. 2, are at right angles to the plane of the drawing. The gear wheel 100 has rigidly connected to it an arm 102 integral with a tappet 104, and the gear wheel 101 has rigidly connected to it an arm 103 integral with a tappet 105. The tappets 104 and 105 are radially displaceable relatively to their respective axes X—X and Y—Y and can be clamped tight in any desired position. The tappet 104 is displaceable in a guide 106 fast with the slide 98 and the tappet 105 in a guide 107 fast with the slide 99, and both these tappets are displaced alternately to each other. The slides 98 and 99 are displaceable by means of rollers 108 and 109 (only the front-most rollers of slide 98 being visible in the drawing) in a plane by an amount which is determined by the space intervening between the tappets 104 and 105 and their respective axes of rotation X—X and Y—Y. Clamping the slides 98 and 99 to the supports 96 and 97 is effected by an air-pressure chamber 112 the upper and lower surfaces of which have a short tube 110 and a diaphragm 111, respectively. The chamber 112 cooperates with a clamping element 113 which is connected by means of spiral springs 114 and 115 to the respective slide and whose ends have jaws 116 and 117 that lie opposite jaws 118 and 119, respectively, fast with said slide. The jaws and the supports, when loose, have small air gaps between them. Right-angled glass prisms 120 and 121, 122 in mounts 123 and 124, 125 are so fixed at an equal height to the slides 93 and 98, 99 that their hypotenuse surfaces are at right angles or almost at right angles to the direction of displacement of the slide 93. The prism 120 constitutes the measuring plane, and the prisms 121 and 122 constitute the reference planes referred to with respect to FIGS. 1 to 3.

In FIGS. 4 and 5, the tappet 104 cooperating through arm 102 with the gear wheel 100 is in mesh with the guide 106 fast with the slide 98, whereas the tappet 105 cooperating through arm 103 with the gear wheel 101 is not in the respective guide 107 on the slide 99. When this position obtains, the arms 102 and 103 are parallel to each other. When the slide 93 is being displaced, the gear wheels 100 and 101 roll along the racks 94 and 95, the senses of rotation being reverse to each other. If the slide 93 and, accordingly, the prism 120 are displaced in a direction B indicated by an arrow, the wheels 100 and 101 rotate in the senses indicated by arrows C and D about their respective axes X—X and Y—Y. In consequence thereof, the tappet 104 displaces the slide 98 and the prism 121 in the direction B as long as it glides in the guide 106. When the tappet 104 after corresponding rotation of the wheel 100 leaves the guide 106, the wheel 101 has effected quite the same, but opposite, rotation and the elongations of the arms 102 and 103 of the two gear wheels include an angle α the bisectrix of which is parallel to the direction of displacement B. When the arms 102 and 103 assume those positions, the slide 98 in a manner described hereinafter is clamped to the supports 96 and 97, and the slide 99 is released from the supports 96 and 97. While the gear wheels 100 and 101 in consequence of the continuous displacement of the slide 93 rotate through the angle α, both the said slides 98 and 99 remain at rest. The magnitude of the said angle α is a function of the distance of the axis of rotation of each gear wheel from the beginning of the respective guide and the position of each tappet on its respective arm. As the rotation of gear 101 progresses, the arm 103 and its tappet 105 arrive in the guide 107 and effect a displacement of the slide 99 in the direction B. Owing to the angular shape of the slides 98 and 99, the motion of the continuously displaced support 93 remains unobstructed in spite of the temporary rest of the slides 98 and 99. The prisms 120 and 121, 122 and the slides 98 and 99 being disposed at an equal height ensures that the prisms 121 and 122 do not, as in the embodiment, FIGS. 1 to 3, overtake but can only catch up with each other and cover a distance at most equal to half the coherence length of the light used for measuring.

Clamping the slides 98 and 99 to their supports is effected as follows:

At the moment a tappet leaves its guide, the respective slide is clamped to and the other slide is released from the supports. In the illustration showing this embodiment of the invention, the slide 99 is clamped to and the slide 98 is released from the supports 96 and 97. After corresponding rotation of the gear wheels 100 and 101 and at the moment the tappet 104 leaves the guide 106, the (not shown) means controlling the air-pressure in the chamber 112 releases the slide 99 from and clamps the slide 98 to the supports. For clamping the slide 98, air is pressed through the short tube 110 into the chamber 112, in consequence of which the diaphragm 111 is caused to lie against that portion of the clamping part 113 which is next to it and the slide 98 is moved upward until the jaws 118 and 119 lie against the supports 96 and 97 and, to avoid compulsive forces, the rollers 108 and 109 are raised from these supports. As more air is being pressed in, also the clamping portion 113 effects a downward motion, which causes the jaws 116 and 117 to be likewise urged against the supports. At that moment, the clamping of the slide 98 to the carriers 96 and 97 is complete. This clamping remains until a corresponding motion of the gear wheels 100 and 101 opens the chamber 112 and permits the compressed air to escape, so that the slide 99 in its turn can be clamped in quite the same manner.

I claim:

1. In an apparatus for producing interferential test data for measuring and control instruments, a light source, a condenser, a diaphragm having an aperture, said condenser imaging said light source in said aperture, a collimator lens making parallel the divergent light rays emanating from said aperture, in the parallel ray path optical ray-dividing elements splitting said path into three partial beams, said three partial beams being a measuring-ray beam and two reference-ray beams, first stationary deflecting surfaces disposed in and deflecting at least two of said partial beams emanating from said ray-dividing elements, three optical deflectors, one of said deflectors deflecting said measuring-ray beam at least approximately 180° and being continuously displaceable in the measuring process, the two other of said deflectors deflecting respectively said reference-ray beams at least approximately 180° and being alternately so displaceable in the measuring process that the change in length of the respective reference-ray beam is no greater than twice the coherence length of the used light, each of said two other deflectors being effective only when in position of rest, a diaphragm related to each of said reference-ray beams and insertable into and out of said beams, other stationary deflecting surfaces disposed in and deflecting at least two of said partial beams emanating from the respective displaceable deflectors, optical ray-fusion elements for combining with the measuring-ray beam the effective reference-ray beam, a convergent optical component for producing images of the interferences due to fusion of said effective reference-ray beam and said measuring-ray beam, a pair of photocells in the plane of said interference images, between said convergent optical component and said photocells means for causing one and the same interference image while being displaced to successively influence said two photocells and thereby to produce current impulses, an impulse former exactly defining the current impulses emanating from said photocells, a discriminator controlling the counting direction in derivation from the phase of the exactly defined current impulses, and a mechanism for directionally counting the impulses from said discriminator.

2. In an apparatus for producing interferential test data for measuring and control instruments, a light source, a condenser, a diaphragm having an aperture, said condenser imaging said light source in said aperture, a collimator lens making parallel the divergent light rays emanating from said aperture, in the parallel ray path optical ray-dividing elements splitting said path into three partial beams, said three partial beams being a measuring-ray beam and two reference-ray beams, first stationary deflecting surfaces disposed in and deflecting at least two of said partial beams emanating from said ray-dividing elements, three optical deflectors, one of said deflectors deflecting said measuring-ray beam at least approximately 180° and being continuously displaceable in the measuring process, the two other of said deflectors deflecting respectively said reference-ray beams at least approximately 180° and being alternately so displaceable in the measuring process that the change in length of the respective reference-ray beam is no greater than twice the coherence length of the used light, each of said two other deflectors being effective only when in position of rest, other stationary deflecting surfaces disposed in and deflecting at least two of said partial beams emanating from the respective displaceable deflectors, a further optical ray-dividing element for splitting into two partial beams the light beam deflected by said continuously displaceable optical deflector, two optical ray-fusion elements, each of said ray-fusion elements combining a reference-ray beam and a partial measuring beam, in each of the combined beams a convergent optical component producing interference images in a plane, a pair of photocells correlated in said image plan to each combined beam, between said convergent optical component and said photocells means for causing one and the same interference image while being displaced to successively influence said pair of photocells and thereby to produce current impulses, an impulse former, a discriminator and an electronic switch being related to each of said pairs of photocells, the switching time of said electronic switch being shorter than the succession of the current impulses produced after each other in each pair of photocells, and a mechanism for counting said impulses.

3. In an apparatus for producing interferential test data for measuring and control instruments, a light source, a condenser, a diaphragm having an aperture, said condenser imaging said light source in said aperture, a collimator lens making parallel the divergent light rays emanating from said aperture, in the parallel ray path two optical ray-dividing elements, each of said ray-dividing elements being disposed in front of one half of said collimator lens and dividing said path into two partial beams, each of said two partial beams consisting of a measuring-ray beam and a reference-ray beam, first stationary deflecting surfaces disposed in and deflecting at least two of said partial beams emanating from said ray-dividing elements, four displaceable optical deflectors, two of said deflectors being rigidly interconnected and continuously displaceable in the measuring process and deflecting said measuring-ray beams at least approximately 180°, the second of said deflectors being in the measuring process alternately displaceable an amount no greater than twice the coherence length of the used light, each of said two other deflectors deflecting a reference-ray beam at least approximately 180° and being effective only when in position of rest, other two stationary deflecting surfaces disposed in and deflecting at least two of said partial beams emanating from the respective displaceable deflectors, two optical ray-fusion elements, each of said ray-fusion elements combining a reference-ray beam and a partial measuring beam, in each of the combined beams a convergent optical component producing interference images in a plane, a pair of photocells correlated in said image plane to each combined beam, between said convergent optical component and said photocells means for causing one and the same interference image while being displaced to successively influence said pair of photocells and thereby to produce current impulses, an impulse former, a discriminator and an electronic switch being related to each of said pairs of photocells, the switching time of said electronic switch being shorter than the succession of the current impulses produced after each other in each pair of photocells, and a mechanism for counting said impulses.

References Cited by the Examiner

Candler: "Modern Interferometry," published by Hilger & Watts Ltd., 1951, pages 115–121 relied on.

JEWELL H. PEDERSEN, *Primary Examiner.*

EMIL G. ANDERSON, *Examiner.*